United States Patent [19]
Mitsui

[11] 3,896,318
[45] July 22, 1975

[54] DRIVING DEVICE FOR LIQUID CRYSTAL CELL
[75] Inventor: Hiromitsu Mitsui, Shimosuwa, Japan
[73] Assignee: Kabushiki Kaisha Suwa Seikosha, Tokyo, Japan
[22] Filed: Dec. 20, 1973
[21] Appl. No.: 426,785

Related U.S. Application Data
[63] Continuation-in-part of Ser. No. 298,678, Oct. 18, 1972, abandoned, which is a continuation-in-part of Ser. No. 99,402, Dec. 18, 1970, abandoned.

[30] Foreign Application Priority Data
Dec. 25, 1969 Japan.............................. 44-103751

[52] U.S. Cl................. 307/304; 58/50 R; 307/251; 350/160 LC; 250/331
[51] Int. Cl........................... G02f 1/28; G02f 3/16
[58] Field of Search............ 307/251, 304; 58/50 R; 313/109.5; 340/336, 324 R; 315/169 R, 169 TV; 350/160 LC

[56] References Cited
UNITED STATES PATENTS

| | | | |
|---|---|---|---|
| 3,519,330 | 7/1970 | Heilmeier..................... | 350/160 LC |
| 3,575,492 | 4/1971 | Nester et al. .................. | 350/160 LC |
| 3,654,606 | 4/1972 | Marlowe et al.................... | 340/166 |
| 3,809,458 | 5/1974 | Heuner et al................ | 350/160 LC |

*Primary Examiner*—James W. Lawrence
*Assistant Examiner*—E. R. LaRoche
*Attorney, Agent, or Firm*—Blum, Moscovitz, Friedman & Kaplan

[57] ABSTRACT

A display device incorporating a liquid crystal cell wherein an insulated gate field effect transistor drives said cell and is connected with its source-drain path in series with said cell and a power source. A pulsating signal is applied to the gate electrode of the transistor, and the frequency and duty cycle thereof is selected to maximize the efficiency of the display driving circuit.

1 Claim, 10 Drawing Figures

DRIVING DEVICE FOR LIQUID CRYSTAL CELL

CROSS-REFERENCE TO RELATED APPLICATIONS

This application is a continuation-in-part of Continuation Application Ser. No. 298,678, filed Oct. 18, 1972, now abandoned, which was a continuation of Application Ser. No. 99,402, filed Dec. 18, 1970, now abandoned.

BACKGROUND OF THE INVENTION

The present invention relates to a driving circuit for a display element such as a liquid crystal cell wherein the transparency of the cell is changed by applying an electric field thereto.

The conventional type of display device is provided with a Nixie tube or a lamp which is illuminated by applying an electric current or electric field thereto. The display elements are self-illuminated by continuously supplying electric energy thereto. Additionally, the energy is applied to the display elements in the form of pulse-wave driving signals in order to reduce power consumption. Further, the frequency of actuation of a display device is predetermined in order to eliminate a flicker effect on the eyes. Such display elements require high voltages (about 100V) and considerable amounts of electric current (on the order of several mA), which cause excessive power consumption. Accordingly, the driving elements for the Nixie tube should be designed so as to minimize the resulting amount of electric power consumed thereby.

In order to drive a digit display tube such as a cathode discharge tube, the driving elements should be designed for high-resistance voltage and for backward high-resistance voltage.

The display element is connected in parallel with a diode for further safety design.

SUMMARY OF THE INVENTION

Generally speaking, in accordance with the invention, a liquid crystal cell-driving circuit is provided which improves the efficiency with which a cell is driven. The liquid crystal cell includes two electrodes and is responsive to an electric field produced upon the application of a voltage to the electrodes. An insulated gate field effect transistor is connected in series along the source-drain path with a first electrode of the cell. A direct-current source is coupled to the other electrode of the cell and is in series with the series path defined by the drain-source path of the transistor and the cell. Finally, a source for providing repetitive pulses having a certain pulse width and duty cycle is applied to the gate electrode of the transistor in order to apply a driving signal to the cell having a pulse width greater than the input signal to more efficiently light the cell.

Accordingly, it is an object of this invention to provide a display device having high reliability, increased efficiency and greater simplicity by combining a liquid crystal cell and a MOS transistor having a high input impedance and capacitance.

Another object of the invention is to provide an improved electric wristwatch using liquid crystal display elements and MOS transistors.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

FIG. 1b is a waveform diagram of the driving signal of the display device of FIG. 1a;

FIG. 3b shows voltage waveforms associated with the circuit of FIG. 3a.

DESCRIPTION OF THE PREFERRED EMBODIMENTS

Figure 1A:
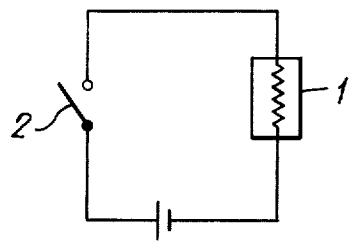
FIG. 1a shows a driving device for driving the conventional type of display device.

Reference is made to FIG. 1a, wherein a conventional driving circuit including a driving element 1 is driven by a switch 2. The continuous driving wave $t_1 - t_2$ which drives the display element 1 is illustrated in FIG. 1b.

Figure 1C:
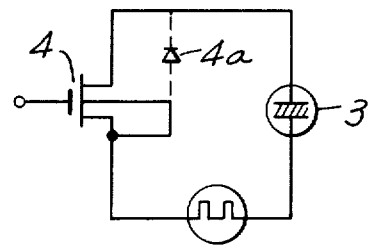
FIG. 1c shows the driving device for driving the liquid crystal cell according to this invention.
Figure 1B:
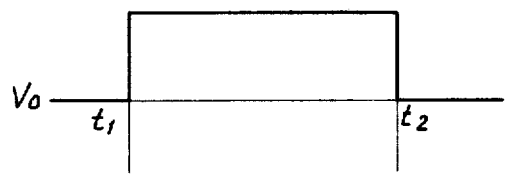
Figure 1D:
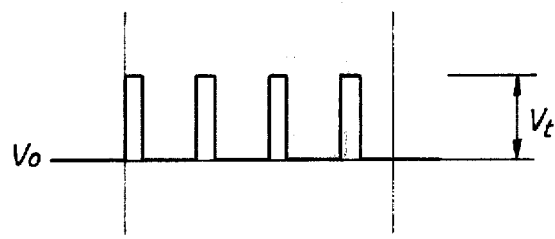
FIG. 1d is a waveform diagram of the ideal driving signal of the display device of FIG. 1c.

FIG. 1c shows a driving circuit including a liquid crystal display device 3 and driven by a switching element consisting of an MOS transistor 4 depicted in FIG. 1c, with the driving voltage signal therefor being illustrated in FIG. 1d. It is noted that the useful life of a liquid crystal cell driven by the DC voltages having a wave shape shown in FIG. 1b is shortened considerably by applying such signals. In order to lengthen the useful life of the liquid crystal cell, a pulsed voltage such as the one depicted in FIG. 1d is applied to the cell to eliminate the flicker effect and to reduce power consumption.

Figure 1E:
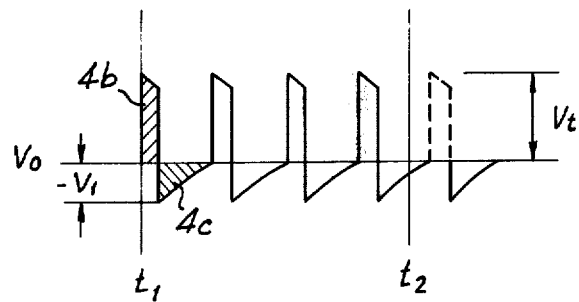
FIG. 1e is a waveform diagram of the actual driving signal of the driving device of FIG. 1c.
Figure 1F:
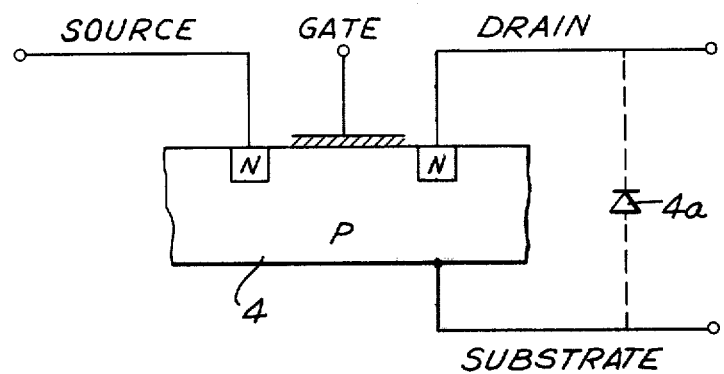
FIG. 1f is a schematic representation of the structure of a MOS transistor.

The inner construction of the N-channel MOS transistor 4 is depicted in FIG. 1f. The substrate of the N-channel MOS transistor is of P-type material and the drain region is of the N type, so that the equivalent of a diode 4a substantially exists between the substrate and the drain electrode. The diode-equivalent characteristic thereof exists in MOS transistors but not in bipolar-type transistors. When the driving voltage shown in FIG. 1d is supplied to a liquid crystal cell 3, a reverse voltage ($-V_1$) is supplied to the liquid crystal cell due to the diode characteristic 4a. As shown in FIG. 1e, the area of the positive pulse 4b is equal to that of the negative pulse 4c.

Figure 1G:
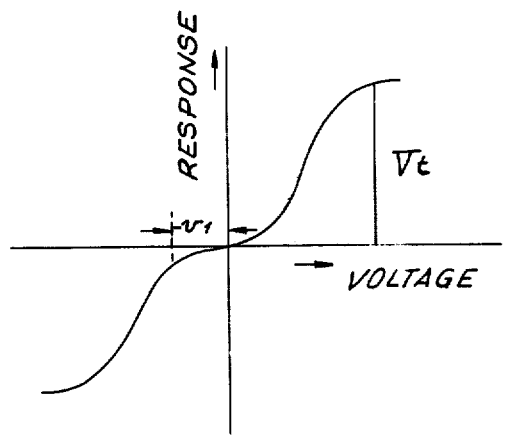
FIG. 1g is a response-versus-voltage diagram for a liquid crystal cell having the driving signal of FIG. 1e applied thereto.

FIG. 1g shows the relation between the response of a liquid crystal cell and the voltage of the electric field applied thereto. The liquid crystal is excited by the voltage $V_t$ but not by the small voltage $-V_1$. The reverse voltage is supplied to MOS transistor 4, and if, for example, the negative pulse is supplied between the drain and source electrodes of the N-channel MOS transistor, the transistor is short-circuited and a diode for preventing the reverse voltage is unnecessary.

Figure 2:
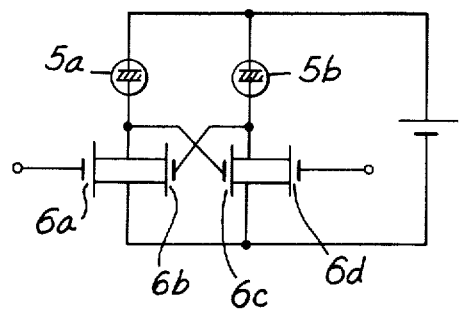
FIGS. 2 and 3a show another embodiment of a driving device for a liquid crystal cell according to this invention.

FIG. 2 shows one embodiment of a driving circuit in which liquid crystal cells 5a and 5b are used as load resistors in a flip-flop circuit incorporating MOS transistors 6a, 6b, 6c and 6d.

The driving circuit wherein a liquid crystal cell is particularly adapted to be driven by a MOS transistor having a high internal resistance is very advantageous. In such a driving circuit using a bipolar type of transistor, electric current flows in the base circuit of the flip-flop circuit. When the flip-flop circuit is reversed, the liquid crystal cell connected to the bipolar type of transistor on the cutoff side is driven by the base current of the bipolar transistor on the opposite side.

A flip-flop circuit using a MOS transistor does not suffer from the above disadvantages, since the input gate impedance of the MOS transistor is very high. Thus, a flip-flop circuit including MOS transistors as shown in FIG. 2 is more normally operated.

Figure 3A:
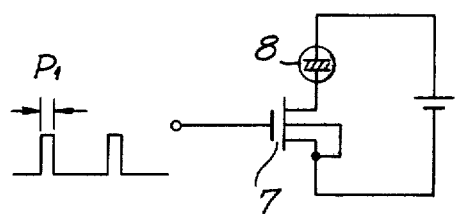
Figure 3B:
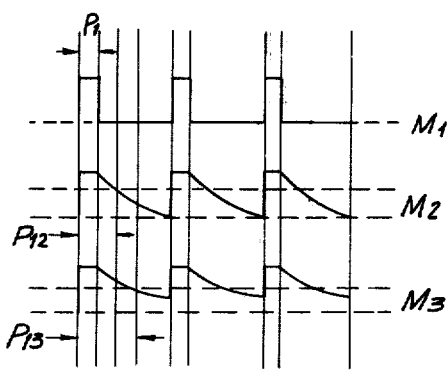

FIG. 3a shows one embodiment of the arrangement in accordance with the invention in which single pulses are supplied intermittently to the liquid crystal cell 8 by MOS transistor 7. As shown in FIG. 3b, when a signal $M_1$ having pulse width $P_1$ is supplied to the gate electrode of the MOS transistor 7, the signal $M_1$ is enlarged to $P_{12}$ as shown by $M_2$ due to the interelectrode capacitance between the gate electrode and the transistor's baseplate and is further enlarged to $P_{13}$ as shown by $M_3$ due to the capacitance of the liquid crystal cell. Therefore, in order to reduce the unnecessary current consumption, the liquid crystal cell is excited by narrow pulses $P_1$ and is driven by the enlarged pulse $P_{13}$, so that a display device is thereby obtained in which the flicker effect for eyes is eliminated.

In accordance with the practicing of the invention it is necessary to select a liquid crystal cell having an internal impedance on the order of 100 meg-ohms or larger. At resistances smaller than 100 meg-ohms, conventional batteries which are practical for use in an electronic wristwatch such as a 1.5 volt battery effect an inefficient use of current in energizing the display cell. Specifically, when the internal resistance of the display cell is less than 100 meg-ohms, and a DC voltage of 1.5 volts is applied, if the current exceeds 15 nano-amps, the current exceeding such a value is useless and inefficient.

Moreover, the internal capacitance of a liquid crystal display cell approximates 10 pico-farads. Thus, if a 1 KH AC signal is applied to a display cell for driving same, the internal impedance thereof will approximate $100/2\pi$ meg-ohms. Accordingly, it is appreciated that the AC driving signal should be considerably lower than 100K Hz and of the order of 500 Hz. Moreover, it has been found that by driving the elements at frequencies as low as 30 Hz, the display cells are rendered visible to the viewer without any flickering. In view of the foregoing it is appreciated that driving the display cell driving circuit depicted in FIG. 3a at frequencies between 30 Hz and 500 Hz and a duty cycle of one-third to one-eighth will yield a display cell and driving circuit therefor which makes more efficient use of the battery by limiting the current consumed thereby.

It will thus be seen that the objects set forth above, among those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A display device comprising liquid crystal cell means having an impedance of 100 meg-ohms or greater and at least two electrodes, said cell means being responsive to an electric field produced upon the application of a voltage to said electrodes; a direct-current power source having a pair of terminals; a source of an input signal formed from repetitive pulses; and an insulated gate field effect transistor for driving said cell means, one of said cell means electrodes being connected to one of the source and drain electrode of said insulated gate field effect transistor, the other of said source and drain electrodes of said transmitter being connected to one of the terminals of said power source, the other terminal of said power source being connected to the other electrode of said cell means, said input signal being applied to the gate electrode of said insulated gate field effect transistor wherein the pulse frequency of said pulse input signal is between 30 and 500 Hz and a duty cycle of one-third to one-eighth to permit the application of a driving pulse to said cell means of increased width relative to the pulse width of said input signal due to the input capacitance of said cell means and said transistor.

* * * * *